(12) United States Patent
Okada et al.

(10) Patent No.: US 6,487,851 B1
(45) Date of Patent: Dec. 3, 2002

(54) EXHAUST EMISSION CONTROL DEVICE OF INTERNAL COMBUSTION ENGINE

(75) Inventors: Kojiro Okada; Takashi Dogahara; Yasuki Tamura, all of Tokyo (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/701,972

(22) PCT Filed: Mar. 30, 2000

(86) PCT No.: PCT/JP00/01990
§ 371 (c)(1),
(2), (4) Date: Dec. 6, 2000

(87) PCT Pub. No.: WO00/60229
PCT Pub. Date: Oct. 12, 2000

(30) Foreign Application Priority Data

Apr. 6, 1999 (JP) ............................................. 11-098475

(51) Int. Cl.⁷ ................................................. F01N 3/00
(52) U.S. Cl. ............................... 60/285; 60/276; 60/301
(58) Field of Search ........................ 60/284, 285, 299, 60/301, 276, 277

(56) References Cited

U.S. PATENT DOCUMENTS

| 5,402,641 A | * | 4/1995 | Katoh et al. ................... 60/285 |
| 5,471,836 A | | 12/1995 | Takeshima et al. |
| 5,595,060 A | * | 1/1997 | Togai et al. .................... 60/285 |
| 5,657,625 A | * | 8/1997 | Koga et al. ..................... 60/285 |
| 5,771,686 A | * | 6/1998 | Pischinger et al. ............ 60/285 |
| 5,775,099 A | * | 7/1998 | Ito et al. ........................ 60/301 |
| 5,937,639 A | * | 8/1999 | Sasaki et al. .................. 60/285 |
| 5,992,144 A | * | 11/1999 | Takanohashi et al. ......... 60/285 |
| 6,161,378 A | * | 12/2000 | Hanaoka et al. ............... 60/286 |
| 6,199,372 B1 | * | 3/2001 | Wakamoto .................... 60/277 |

FOREIGN PATENT DOCUMENTS

| JP | 61-234254 | | 10/1986 |
| JP | 6-330741 | | 11/1994 |
| JP | 7-63151 | | 3/1995 |
| JP | 7-139342 | | 5/1995 |
| JP | 7-166851 A | | 6/1995 |
| JP | 7-166851 | | 6/1995 |
| JP | 7-208151 | | 8/1995 |
| JP | 2503387 B2 | | 4/1996 |
| JP | 2586738 B2 | | 12/1996 |
| JP | 02000204935 | * | 7/2000 |

* cited by examiner

*Primary Examiner*—Thomas Denion
*Assistant Examiner*—Diem Tran
(74) *Attorney, Agent, or Firm*—Birch, Stewart, Kolasch & Birch, LLP

(57) ABSTRACT

An $NO_x$ sensor 27 detects the concentration of $NO_x$ released from an occlusion type $NO_x$ catalyst 25 into the atmosphere. Based on the output of the $NO_x$ sensor 27, a total $NO_x$ discharge A is computed. When the total $NO_x$ discharge A reaches an $NO_x$ emission judgment amount $A_0$, corresponding to an $NO_x$ emission judgment amount designated by $NO_x$ emission regulations, before a distance traveled C reaches a predetermined distance traveled $C_0$, an exhaust air-fuel ratio is changed to a rich air-fuel ratio to release $NO_x$ from the occlusion type $NO_x$ catalyst 25 efficiently. Then, the exhaust air-fuel ratio is changed to a stoichiometric air-fuel ratio to purify and reduce $NO_x$ by a three-way catalyst function.

12 Claims, 9 Drawing Sheets

EXHAUST EMISSION CONTROL DEVICE OF INTERNAL COMBUSTION ENGINE

This application is the national phase under 35 U.S.C. §371 of PCT International Application No. PCT/JP00/01990 which has an International filing date of Mar. 30, 2000, which designated the United States of America.

TECHNICAL FIELD

This invention relates to an exhaust emission control device of an internal combustion engine, which has an occlusion type $NO_x$ catalyst in an exhaust passage.

BACKGROUND ART

In recent years, a lean burn internal combustion engine designed to be operated at a lean air-fuel ratio for improved fuel economy has come into practical use. When this lean burn internal combustion engine is operated at a lean air-fuel ratio, a three-way catalyst cannot fully purify $NO_x$ (nitrogen oxides) in an exhaust gas because of the purification characteristics of the catalyst. Recently, for example, use has been made of an exhaust emission purification catalyst device with an occlusion type $NO_x$ catalyst which occludes or adsorbs (hereinafter referred to simply as occludes) $NO_x$ in an exhaust gas during operation at a lean air-fuel ratio, and which releases and reduces the occluded $NO_x$ during operation at a stoichiometric air-fuel ratio or a rich air-fuel ratio.

The occlusion type $NO_x$ catalyst has the properties of attracting and occluding $NO_x$ in an exhaust gas as nitrates ($X-NO_3$) in the presence of excess oxygen in the internal combustion engine, and releasing the occluded $NO_x$ mainly in the presence of excess carbon monoxide (CO) to reduce it to nitrogen ($N_2$) (and simultaneously form carbonates ($X-CO_3$)). In actuality, therefore, when the operation at a lean air-fuel ratio continues for a predetermined period of time, the air-fuel ratio in a combustion chamber is changed. Alternatively, the operation at the lean air-fuel ratio is periodically switched to operation at a rich air-fuel ratio by such means as supply of a reducing agent to an exhaust pipe to control the air-fuel ratio to a stoichiometric air-fuel ratio or a rich air-fuel ratio (this method is called rich spike). As a result, a CO-abundant reducing atmosphere is produced in an oxygen concentration-poor atmosphere to release the occluded $NO_x$ for purifying reduction ($NO_x$ purge). In this manner, the occlusion type $NO_x$ catalyst can be regenerated. This technology is disclosed, for example, in Japanese Patent No. 2,586,738.

Such an occlusion type $NO_x$ catalyst is limited in the amount of $NO_x$ that can be occluded onto the catalyst. When the amount of $NO_x$, which the occlusion type $NO_x$ catalyst has occluded, reaches the limit, rich spike is performed as stated earlier, so that a rich air-fuel ratio operation is carried out at a predetermined rich air-fuel ratio for a predetermined period of time.

The time point, at which the occluded amount of $NO_x$ in the occlusion type $NO_x$ catalyst reaches the limit and rich spike is required, changes according to the degree of deterioration in the $NO_x$ purification efficiency of the occlusion type $NO_x$ catalyst, or according to the operating conditions for the internal combustion engine that affect the flow rates of $NO_x$ and CO. A technology for detecting that the amount of $NO_x$ occluded by such an occlusion type $NO_x$ catalyst has reached the limit, and regenerating this catalyst is disclosed, for example, in Japanese Unexamined Patent Publication No. Hei 7-166851.

According to an "exhaust emission control device" as disclosed in this publication, an $NO_x$ absorber is disposed in an exhaust passage of an internal combustion engine, and an $NO_x$ sensor is disposed downstream from the $NO_x$ absorber. With this arrangement, the exhaust emission control device performs regenerating control ($NO_x$ purge) in the following manner: When a detection value detected by the $NO_x$ sensor (i.e., the concentration of the $NO_x$ component) has exceeded a judgment value, the exhaust air-fuel ratio is switched to a rich air-fuel ratio to release $NO_x$ from an upper region of the catalyst.

The regulatory value according to the $NO_x$ emission regulations in different countries of the world is, for example, total $NO_x$ discharge over a predetermined distance traveled by a vehicle. The aforementioned conventional "exhaust emission control device" executes regenerating control by detecting the concentration of the $NO_x$ component during each lean operation zone which is a certain short period. Thus, if the set judgment value allows only a narrow margin because of a driver's way of driving, it is likely that the desired $NO_x$ discharge, e.g., the regulatory value, for each predetermined distance traveled cannot necessarily be cleared reliably.

That is, in the above-mentioned "exhaust emission control device," whether the total $NO_x$ discharge over the predetermined distance traveled has not exceeded a desired value, e.g., the regulatory value, is not grasped during driving. To keep the total $NO_x$ discharge over the predetermined distance traveled at a predetermined value or less under various driving conditions, therefore, there is need to set the aforementioned judgment value for initiation of regenerating control ($NO_x$ purge) at a low value with a sufficient margin. By setting the judgment value in this manner, the frequency of regenerating control ($NO_x$ purge) for making the air-fuel ratio a rich or stoichiometric value increases because of an ample margin, thereby increasing fuel consumption. That is, the problem of increasing $CO_2$ discharge arises.

A technology for controlling $NO_x$ discharge over a predetermined distance traveled to be within a predetermined value is disclosed, for example, in Japanese Patent No. 2,503,387. An "electronic internal combustion engine control device" as disclosed in this publication controls the ignition timing and the EGR amount to control $NO_x$ discharge, only in a stoichiometric operation region. If this control device is applied to a lean burn internal combustion engine operating at a lean air-fuel ratio as described earlier, the air-fuel ratio has to be constantly set in the stoichiometric operation region, and fuel economy cannot be improved.

The present invention has been accomplished to solve the above problems. Its object is to provide an exhaust emission control device of an internal combustion engine, which can directly manage $NO_x$ discharge, released into the atmosphere, under any driving conditions to keep the $NO_x$ discharge at a desired value reliably and achieve a decrease in $NO_x$ discharge and a decrease in $CO_2$ discharge at the same time, without deteriorating fuel economy.

DISCLOSURE OF THE INVENTION

An exhaust emission control device of an internal combustion engine according to the present invention includes an exhaust emission purification catalyst device provided in an exhaust passage of the internal combustion engine, and having a $NO_x$ decreasing function of purifying or occluding $NO_x$ in an exhaust gas when an exhaust air-fuel ratio is a lean air-fuel ratio, and the reducing function of reducing hazardous substances in the exhaust gas when the exhaust air-fuel ratio is a stoichiometric air-fuel ratio or a rich air-fuel ratio; $NO_x$ detection means for detecting or estimating the concentration of $NO_x$ released into the atmosphere; and control means for computing an $NO_x$ discharge released into the atmosphere based on an output from the $NO_x$ detection means, and stopping or suppressing an operation at a lean air-fuel ratio when detecting or expecting that a total $NO_x$ discharge exceeds a predetermined value before a vehicle reaches a predetermined driving period.

Thus, when the exhaust air-fuel ratio is a lean air-fuel ratio, $NO_x$ in the exhaust gas is purified or occluded. A total $NO_x$ discharge is computed from the concentration of $NO_x$ released into the atmosphere, with a predetermined driving period as a cycle. If it is detected or expected that the total $NO_x$ discharge exceeds the predetermined value before the predetermined driving period is reached, operation at the lean air-fuel ratio is stopped or suppressed, and the reducing function of the exhaust emission purification catalyst device is performed. Under any driving conditions, therefore, poor fuel economy is not induced. Under any driving conditions, moreover, the $NO_x$ discharge can be restricted to the desired value. Thus, a decrease in $NO_x$ discharge and a decrease in $CO_2$ discharge can be achieved at the same time.

In the exhaust emission control device of an internal combustion engine according to the present invention, the control means may change the exhaust air-fuel ratio to a stoichiometric air-fuel ratio or a rich air-fuel ratio when it detects that the total $NO_x$ discharge has exceeded the predetermined value before the vehicle reaches the predetermined driving period. By doing so, hazardous substances in the exhaust gas can be reduced, and the $NO_x$ decreasing function of the exhaust emission purification catalyst device can be regenerated immediately.

In the exhaust emission control device of an internal combustion engine according to the present invention, after changing the exhaust air-fuel ratio to the stoichiometric air-fuel ratio or the rich air-fuel ratio when detecting that the total $NO_x$ discharge has exceeded the predetermined value before the vehicle reaches the predetermined driving period, the control means may maintain the exhaust air-fuel ratio at the stoichiometric air-fuel ratio or the rich air-fuel ratio until the vehicle reaches the predetermined driving period. By doing so, $NO_x$ emission can be suppressed.

In the exhaust emission control device of an internal combustion engine according to the present invention, the control means may also decrease an operation region at the lean air-fuel ratio if the total $NO_x$ discharge is expected to exceed the predetermined value before the vehicle reaches the predetermined driving period. By doing so, the lean operation can be continued in an optimal driving state, with $NO_x$ emission being suppressed. Thus, fuel economy can be improved.

In the exhaust emission control device of an internal combustion engine according to the present invention, the control means may also change the operation region at the lean air-fuel ratio based on the total $NO_x$ discharge midway through the predetermined driving period. By doing so, the lean operation can be continued in an optimal driving state, with $NO_x$ emission being suppressed. Thus, fuel economy can be improved.

In the exhaust emission control device of an internal combustion engine according to the present invention, the control means may also reset the computation of the total $NO_x$ discharge and measurement of the predetermined driving period when the vehicle reaches the predetermined driving period. At this time point, control for $NO_x$ suppression is started.

In the exhaust emission control device of an internal combustion engine according to the present invention, if the total $NO_x$ discharge does not exceed the predetermined value even when the vehicle has reached the predetermined driving period, the control means may change the exhaust air-fuel ratio to a stoichiometric air-fuel ratio or a rich air-fuel ratio after the total $NO_x$ discharge exceeds the predetermined value, and then the control means may reset the computation of the total $NO_x$ discharge and measurement of the predetermined driving period. At this point in time point, control for $NO_x$ suppression is started.

In the exhaust emission control device of an internal combustion engine according to the present invention, if the duration of the operation at the lean air-fuel ratio exceeds a predetermined threshold time, the control means may change the exhaust air-fuel ratio to a stoichiometric air-fuel ratio or a rich air-fuel ratio. By doing so, the $NO_x$ decreasing function can be regenerated, with $NO_x$ emission being suppressed.

In the exhaust emission control device of an internal combustion engine according to the present invention, if the duration of the operation at the lean air-fuel ratio is a predetermined threshold time or more, and if the total $NO_x$ discharge or an average $NO_x$ concentration or an instantaneous $NO_x$ concentration is a predetermined value or more during the predetermined threshold time or more, the control means may change the exhaust air-fuel ratio to a stoichiometric air-fuel ratio or a rich air-fuel ratio.

In the exhaust emission control device of an internal combustion engine according to the present invention, the control means may change the predetermined value for the total $NO_x$ discharge according to the vehicle speed. This makes $NO_x$ emission suppressing control possible according to the driving state of the vehicle.

In the exhaust emission control device of an internal combustion engine according to the present invention, the exhaust air-fuel ratio may be changed to a stoichiometric air-fuel ratio or a rich air-fuel ratio in response to a driver's acceleration action, and fuel injection into a cylinder in and after an expansion stroke may be used concomitantly at an initial stage of changing the air-fuel ratio. By doing so, $NO_x$ can be reduced at an early stage, so that the total $NO_x$ discharge can be decreased.

BEST MODE FOR CARRYING' OUT THE INVENTION

Embodiments of the present invention will now be described in detail based on the accompanying drawings.

First Embodiment

An internal combustion engine (hereinafter referred to as an engine) of the first embodiment is a direct injection type spark ignition in-line four-cylinder gasoline engine which can perform fuel injection during an intake stroke (intake stroke injection mode) or fuel injection during a compression stroke (compression stroke injection mode), for example, by changing a fuel injection mode (operation mode). An engine 11 of a direct injection type can easily realize an operation at a stoichiometric air-fuel ratio (stoichiometric operation), an operation at a rich air-fuel ratio (rich air-fuel ratio operation), or an operation at a lean air-fuel ratio (a lean air-fuel ratio operation). In the compression stroke injection mode, in particular, an operation at a superlean air-fuel ratio is possible.

Figure 1:
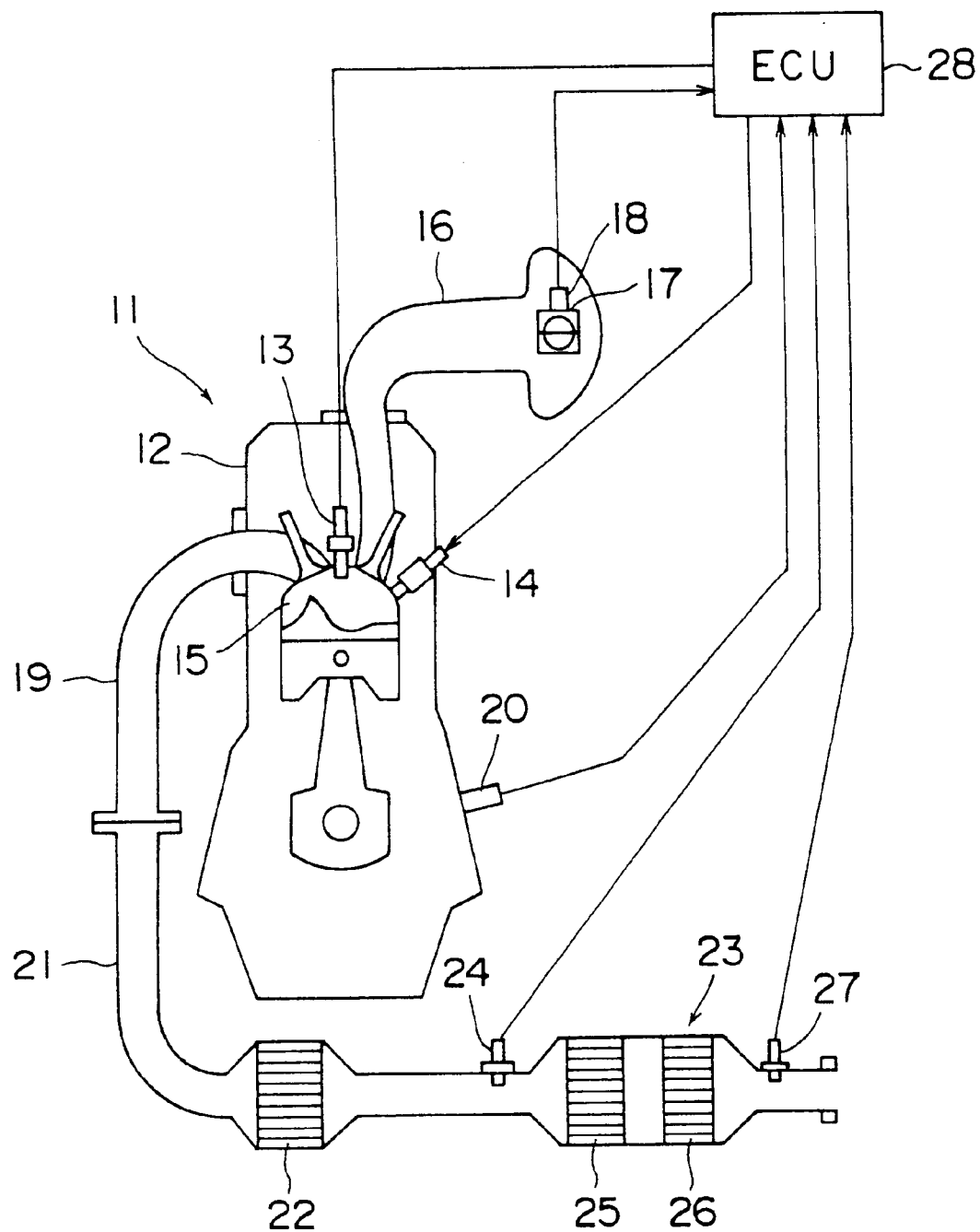
FIG. 1 shows a schematic constitution of an exhaust emission control device of an internal combustion engine according to a first embodiment of the present invention.

In the present embodiment, as shown in FIG. 1, an electromagnetic fuel injection valve 14 is attached, along with a spark plug 13, to a cylinder head 12 of the engine 11, for each cylinder. Fuel is directly injectable to the interior of a combustion chamber 15 by the fuel injection valve 14. Fuel supply equipment (fuel pump) is connected to the fuel injection valve 14 via a fuel pipe (not shown) to supply fuel within a fuel tank at a high fuel pressure. This fuel is injected from the fuel injection valve 14 toward the interior of the combustion chamber 15 at a desired fuel pressure. At this time, a fuel injection quantity is determined by the fuel discharge pressure of the fuel pump and the valve opening time of the fuel injection valve 14 (i.e., fuel injection time).

In the cylinder head 12, an intake port is formed in a nearly upright direction for each cylinder. An end of an intake manifold 16 is connected to the cylinder head 12 so as to communicate with each intake port. To the other end of the in take manifold 16, an electrically operated throttle valve 17 on a drive by wire (DBW) system is connected. On the throttle valve 17, a throttle sensor 18 for detecting a throttle angle (θth) is provided. In the cylinder head 12, an exhaust port is formed in a nearly horizontal direction for each cylinder. An end of an exhaust manifold 19 is connected to the cylinder head 12 so as to communicate with each exhaust port.

In the engine 11, a crank angle sensor 20 for detecting a crank angle is provided. The crank angle sensor 20 can detect an engine speed Ne. The above-mentioned direct injection engine 11 is already publicly known, and an explanation for details of its constitution is omitted herein.

An exhaust pipe (exhaust passage) 21 is connected to the exhaust manifold 19 of the engine 11. A muffler (not shown) is connected to the exhaust pipe 21 via a three-way catalyst 22 of a small size provided in proximity to the engine 11, and an exhaust emission purification catalyst device 23. In a portion in the exhaust pipe 21 between the three-way catalyst 22 and the exhaust emission purification catalyst device 23, a high temperature sensor 24 for detecting an exhaust gas temperature is provided immediately upstream from the exhaust emission purification catalyst device 23, i.e., immediately upstream from an occlusion type $NO_x$ catalyst 25 to be described later on.

The exhaust emission purification catalyst device 23 comprises two catalysts, the occlusion type $NO_x$ catalyst 25 and a three-way catalyst 26, in order to have the $NO_x$ decreasing function of occluding $NO_x$ in an exhaust gas when an exhaust air-fuel ratio is a lean air-fuel ratio, and the oxidizing-reducing function of purifying hazardous substances (HC, CO, $NO_x$) in the exhaust gas when the exhaust air-fuel ratio is close to a stoichiometric air-fuel ratio. Downstream from the occlusion type $NO_x$ catalyst 25, the three-way catalyst 26 is disposed. The three-way catalyst 26 plays the role of reducing $NO_x$ which has not been reduced by the occlusion type $NO_x$ catalyst 25 itself when occluded $NO_x$ is released from the occlusion type $NO_x$ catalyst 25. If the occlusion type $NO_x$ catalyst 25 has the full function of a three-way catalyst (hereinafter referred to as a three-way function) which reduces $NO_x$ and oxidizes HC and CO, the exhaust emission purification catalyst device 23 may be of an occlusion type $NO_x$ catalyst/three-way catalyst integrated type, composed of the occlusion type $NO_x$ catalyst 25 alone. The occlusion type $NO_x$ catalyst 25 has the function of once occluding $NO_x$ in an oxidizing atmosphere ($NO_x$ decreasing function), and the reducing function of releasing $NO_x$ in a reducing atmosphere where CO mainly exists, to reduce it to $N_2$ (nitrogen), etc. In detail, the occlusion type $NO_x$ catalyst 25 is composed as a catalyst containing platinum (Pt), rhodium (Rh), or the like as a noble metal, and employs an alkali metal or an alkaline earth metal, such as barium (Ba), as an occluding material. Downstream from the exhaust emission purification catalyst device 23, an $NO_x$ sensor ($NO_x$ detecting means) 27 for detecting the concentration of $NO_x$ is provided.

Furthermore, an ECU (electronic control unit) 28 having an input-output device, a storage device (ROM, RAM, nonvolatile RAM, etc.), a central processing unit (CPU), and a timer counter is provided. This ECU 28 performs integrated control of the exhaust emission control device of the present embodiment including the engine 11. That is, various sensors, such as the above-mentioned high temperature sensor 24 and $NO_x$ sensor 27, are connected to the input side of the ECU 28 for entry of detection information from these sensors. To the output side of the ECU 28, the above-mentioned spark plug 13 is connected via an ignition coil, and the fuel injection valve 14 is connected. Optimal values for a fuel injection quantity and an ignition timing, which have been computed based on detection information from the various sensors, are produced for the ignition coil and fuel injection valve 14. Based on the optimal values, a proper amount of fuel is injected from the fuel injection valve 14 at a proper timing, and ignition is carried out by the spark plug 13 at a proper timing.

In the ECU 28, a target cylinder pressure adapted for an engine load, i.e., a target mean effective pressure Pe, is found based on accelerator opening information from an accelerator opening sensor (not shown) and the engine speed information Ne from the crank angle sensor 20. Moreover, the fuel injection mode is set from a map (not shown) in response to the target mean effective pressure Pe and the engine speed information Ne. When the target mean effective pressure Pe and the engine speed Ne are both small, for example, the fuel injection mode is rendered the compression stroke injection mode, whereby fuel is injected during the compression stroke. When the target mean effective pressure Pe is great, or the engine speed Ne is high, on the other hand, the fuel injection mode is rendered the intake stroke injection mode, whereby fuel is injected during the intake stroke.

Based on the target mean effective pressure Pe and the engine speed Ne, a target air-fuel ratio (target A/F) as a control target is set. A proper fuel injection quantity is determined based on this target A/F. A catalyst temperature Tcat is estimated from exhaust gas temperature information detected by the high temperature sensor 24. In detail, to correct for an error due to the high temperature sensor 24 and the occlusion type $NO_x$ catalyst 25 being placed apart from each other although slightly, a temperature difference map according to the target mean effective pressure Pe and the engine speed information Ne is set beforehand by experiments. The catalyst temperature Tcat is estimated unconditionally when the target mean effective pressure Pe and the engine speed information Ne are determined.

Operation of the so constituted exhaust emission control device of the internal combustion engine according to the present embodiment will be described below.

In the occlusion type $NO_x$ catalyst 25 of the exhaust emission purification catalyst device 23, $NO_x$ in the exhaust is occluded as nitrates in an excess oxygen concentration atmosphere during, for example, a superlean burn operation in the lean mode to perform purification of the exhaust. In an oxygen concentration decreased atmosphere, on the other hand, the nitrates occluded onto the occlusion type $NO_x$ catalyst 25 and CO in the exhaust react to form carbonates and release $NO_x$. Thus, as the occlusion of $NO_x$ onto the occlusion type $NO_x$ catalyst 25 proceeds, enrichment of the air-fuel ratio or additional fuel injection is performed to lower the oxygen concentration and supply CO. As a result, $NO_x$ is released from the occlusion type $NO_x$ catalyst 25 to maintain the function.

The regulatory value according to the $NO_x$ emission regulations in different countries of the world is, for example, a total $NO_x$ discharge over a predetermined distance traveled. In the exhaust emission control device of the internal combustion engine according to the present embodiment, the distance traveled by a vehicle is detected (distance traveled detection means) based on signals from a vehicle speed sensor as a parameter correlated to the distance traveled by the vehicle. The $NO_x$ sensor 27 detects the concentration of $NO_x$ released from the occlusion type $NO_x$ catalyst 25. Based on outputs from the $NO_x$ sensor 27, the ECU 28 computes a total $NO_x$ discharge which can be released into the atmosphere. Besides, the ECU (control means) 28 changes the exhaust air-fuel ratio to a stoichiometric air-fuel ratio or a rich air-fuel ratio when the total $NO_x$ discharge has exceeded a predetermined value before a predetermined distance traveled is reached. By this measure, $NO_x$ is released from the occlusion type $NO_x$ catalyst 25 and reduced for purification to diminish the $NO_x$ discharge.

The $NO_x$ discharge control will be described based on a flow chart of FIG. 2.

Figure 2:
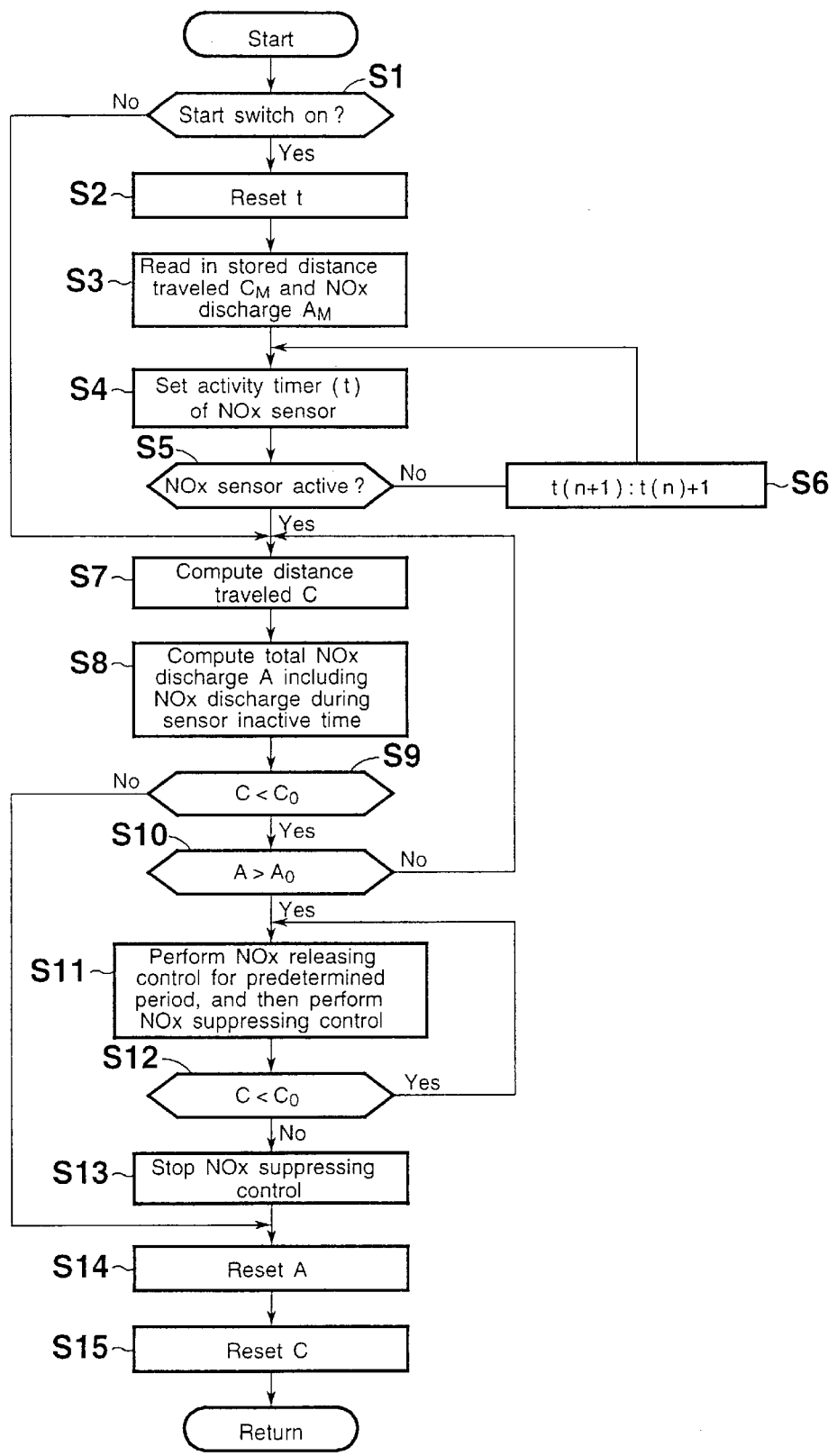
FIG. 2 is a flow chart for $NO_x$ discharge control by the exhaust emission control device of the internal combustion engine according to the present embodiment.

As shown in FIG. 2, the engine is started by a starter at Step S1 to turn on a start switch. An activity timer t of the $NO_x$ sensor 27 is reset at Step S2. A distance traveled $C_M$ and an $NO_x$ discharge $A_M$ kept in storage are read in at Step S3. The distance traveled $C_M$ and the $NO_x$ discharge $A_M$ kept in storage are a distance traveled C and an $NO_x$ discharge A stored by ECU's battery backup at a time when ignition is cut off, with $NO_x$ being occluded to some degree into the occlusion type $NO_x$ catalyst 25 and without final $NO_x$ purge, during $NO_x$ discharge suppression after summation of the distance traveled and $NO_x$ discharge in the preceding operation in a manner to be described later on. The activity timer t of the $NO_x$ sensor 27 is set at Step S4. Whether the $NO_x$ sensor 27 has been activated or not is judged at Step S5. A time elapsed until the $NO_x$ sensor 27 becomes active is summed at Step S6. When the $NO_x$ sensor 27 becomes active, the program goes to Step S7.

At Step S7, the distance C traveled after resetting of a distance traveled counter (not shown) is computed. Step S8 is designed to compute a total $NO_x$ discharge A including the amount of $NO_x$ discharged over a time over which the $NO_x$ sensor 27 becomes active after resetting. In this case, the total $NO_x$ discharge A (g) can be computed from the following Equation (1):

$$A_{(n)}=A_{(n-1)}+Q \times dt \quad (1)$$

where $A_{(n)}$ is the total $NO_x$ discharge, $A_{(n-1)}$ is the total $NO_x$ discharge for the preceding operation, Q is an $NO_x$ emission flow rate (g/s), and dt is a sampling time. The $NO_x$ emission flow rate Q can be computed from the following Equation (2):

$$Q=NO_x \text{ concentration} \times \text{exhaust flow rate} \quad (2)$$

where $NO_x$ concentration is the output value of the $NO_x$ sensor 27, and the exhaust flow rate (g/s) may be represented by an intake air flow rate detected by an air flow sensor or the like (e.g., an air flow sensor frequency in the case of a Karman vortex air flow sensor), or may be set by a preset load/engine speed map of the engine 11.

If the output of the $NO_x$ sensor 27 is unstable, for example, because of a state immediately after switching of a stoichiometric or rich operation to a lean operation, calculation may be made, with the $NO_x$ concentration a predetermined period M after switching being tentatively regarded as an output value of the $NO_x$ sensor 27 after a lapse of the predetermined period M. Alternatively, calculation may be made on the assumption that the $NO_x$ concentration immediately after switching was 0 and linearly increased or gradually increased to the output value of the $NO_x$ sensor 27 after a lapse of the predetermined period M.

At Step S9, it is judged whether the distance traveled C has not reached, for example, a predetermined distance traveled $C_0$ determined as a control unit by the $NO_x$ emission regulations. If the distance traveled C has not reached the predetermined distance traveled $C_0$, it is judged at Step S10 whether the total $NO_x$ discharge A determined by the aforementioned equation (1) exceeds an $NO_x$ emission judgment amount $A_0$ for the predetermined distance traveled $C_0$. In this case, the $NO_x$ emission judgment amount $A_0$ is determined by multiplying an $NO_x$ emission allowable amount, which has been designated by the $NO_x$ emission regulations, by a percentage allowance α which is determined by the $NO_x$ discharge during an operation other than a lean operation, and the detection accuracy of the $NO_x$ sensor 27.

If at Step S10 the total $NO_x$ discharge A does not exceed the $NO_x$ emission judgment amount $A_0$, Step S8 is resumed, and the total $NO_x$ discharge A is computed again from the aforementioned equation (a), namely, the $NO_x$ discharge is added. If at Step S9 the distance traveled C computed at Step S7 has not reached the predetermined distance traveled $C_0$, it is judged again at Step S10 whether the total $NO_x$ discharge A exceeds the $NO_x$ emission judgment amount $A_0$. In this manner, Steps S7, S8, S9 and S10 are repeated until the total $NO_x$ discharge A exceeds the $NO_x$ emission judgment amount $A_0$ at Step S10, or until the distance traveled C reaches the predetermined distance traveled $C_0$ at Step S9.

When the total $NO_x$ discharge A exceeds the $NO_x$ emission judgment amount $A_0$ at Step S10, $NO_x$ releasing control is performed, and then $NO_x$ suppressing control is performed, at Step S11. That is, since occlusion of $NO_x$ onto the occlusion type $NO_x$ catalyst 25 has proceeded, the exhaust air-fuel ratio is changed to a rich air-fuel ratio to lower the oxygen concentration, thereby efficiently releasing $NO_x$ from the occlusion type $NO_x$ catalyst 25 for reduction thereof. When $NO_x$ is released from the occlusion type $NO_x$ catalyst 25, the exhaust air-fuel ratio is changed to a stoichiometric air-fuel ratio so that $NO_x$ will be reduced and purified by the threeway function of the catalyst. By this measure, the total $NO_x$ discharge A during the predetermined distance traveled $C_0$ can be restricted to the $NO_x$ emission judgment amount $A_0$.

Figure 6:
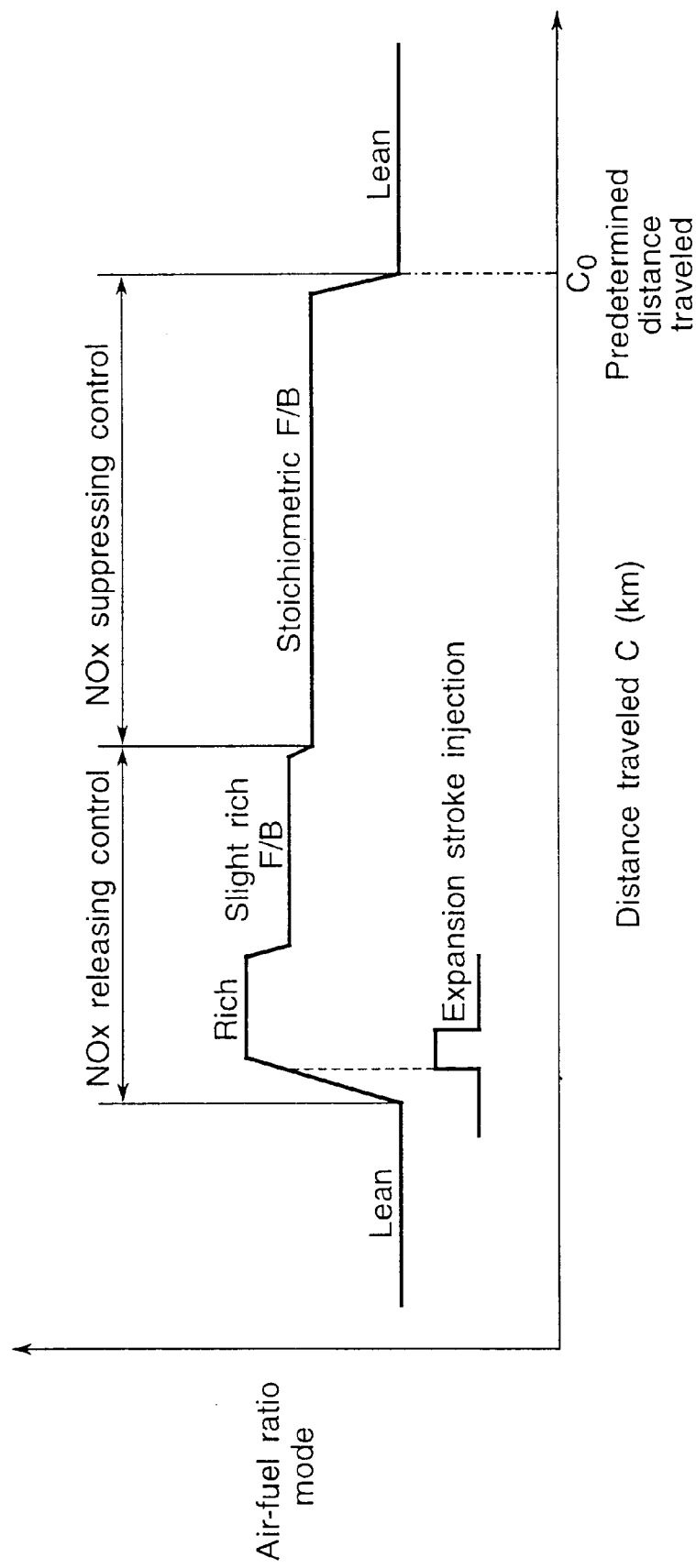
FIG. 6 is a time chart for $NO_x$ releasing control and $NO_x$ suppressing control.

The above-mentioned $NO_x$ releasing control, and subsequent $NO_x$ suppressing control will be explained based on the time chart of FIG. 6. When the total $NO_x$ discharge A exceeds the $NO_x$ emission judgment amount $A_0$, the air-fuel ratio is changed to switch a lean operation to a rich operation for the purpose of $NO_x$ releasing control. In this case, CO is mainly supplied to the occlusion type $NO_x$ catalyst 25. For this purpose, a rich operation is performed for 1 to 5 seconds at A/F=12, for example. Initially during the rich period, $NO_x$ is released in a large amount. To supply the catalyst with HC for reducing $NO_x$, therefore, expansion stroke injection is performed for 0.1 to 0.5 second, for example, at a time when A/R reaches a predetermined value. Then, since $NO_x$ is slowly released, it is sufficient to supply CO and HC in small amounts. Hence, the air-fuel ratio is switched to a slightly rich ratio (slight rich mode), and an operation is performed at this ratio for a time which is about 0 to 50% of the lean time immediately before this slight rich mode. During this slight rich period, a feedback operation using an $O_2$ sensor (not shown) may be performed. Parameters, such as time and air-fuel ratio, are changed according to the operating state or the state of the catalyst, for example, space velocity SV=exhaust flow rate/catalyst volume, amount of CO supply to the catalyst, amount of $NO_x$ occluded in the catalyst, catalyst temperature, and deterioration of the catalyst. A series of the rich operation, the expansion stroke injection operation, and the slight rich operation up to this stage constitutes $NO_x$ releasing control. Then, until the distance traveled C reaches the predetermined distance traveled $C_0$ at Step S12, a slight rich mode operation is continued so that $NO_x$ can be reliably purified by the three-way function of the catalyst ($NO_x$ releasing control). In the $NO_x$ releasing control of FIG. 6, a slight rich operation is performed after a rich operation. However, the air-fuel ratio may be changed to a stoichiometric ratio according to the characteristics of the catalyst.

As noted above, the occlusion type $NO_x$ catalyst 25 is regenerated by $NO_x$ releasing control, and the exhaust air-fuel ratio is changed to a stoichiometric air-fuel ratio by $NO_x$ suppressing control until the distance traveled C reaches the predetermined distance traveled $C_0$ at Step S12. When the distance traveled C reaches the predetermined distance traveled $C_0$, $NO_x$ suppressing control for changing the exhaust air-fuel ratio to a stoichiometric air-fuel ratio is stopped at Step S13. After the total $NO_x$ discharge A is reset at Step S14, the distance traveled C is reset at Step S15.

Figure 4:
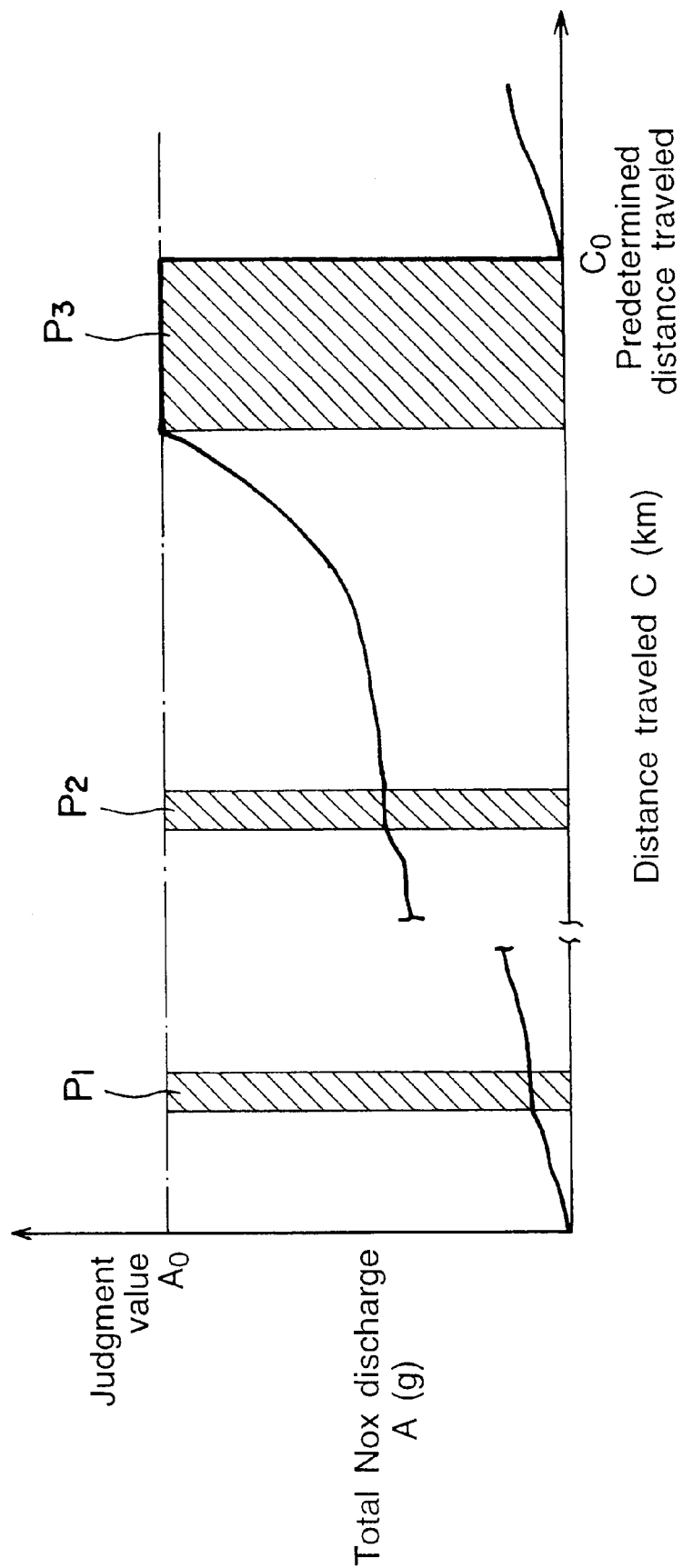
FIGS. 4 and 5 are time charts for $NO_x$ discharge control.

The foregoing $NO_x$ discharge control for the predetermined distance traveled $C_0$ will be described concretely. As shown in FIG. 4, a total $NO_x$ discharge A increases with the increase in the distance traveled C. In regions $P_1$ and $P_2$ where spontaneous acceleration takes place as a result of depression of an accelerator pedal by a driver, the exhaust air-fuel ratio changes to a rich or stoichiometric air-fuel ratio, and $NO_x$ is naturally released from the occlusion type $NO_x$ catalyst 25 (this type of $NO_x$ release is termed natural $NO_x$ purge in comparison with forced $NO_x$ purge), even without performing forced $NO_x$ purge for changing the A/F ratio forcibly during continuation of a lean operation. When the total $NO_x$ discharge A exceeds the $NO_x$ emission judgment amount $A_0$ before the distance traveled C reaches the predetermined distance traveled $C_0$, the exhaust air-fuel ratio is forcibly changed to a rich air-fuel ratio at an initial stage of a region $P_3$ (including expansion stroke injection and slight rich or stoichiometric air-fuel ratio periods) to release $NO_x$ from the occlusion type $NO_x$ catalyst 25. Then, when the purifying function of the occlusion type $NO_x$ catalyst 25 is restored (regenerated) because of $NO_x$ release, the exhaust air-fuel ratio is changed to nearly a stoichiometric air-fuel ratio. Until the distance traveled C exceeds the predetermined distance traveled $C_0$, emission of $NO_x$ into the atmosphere is prevented by the function of the three-way catalyst 26. The time when the distance traveled C reaches the predetermined distance traveled $C_0$ is regarded as a reference point, and the total $NO_x$ discharge A and the distance traveled C are reset based on the reference point to restart control of $NO_x$ discharge for the predetermined distance traveled $C_0$.

As shown in FIG. 2, in the processings for repeating the aforementioned Steps S7, S8, S9, and S10, there may be a case in which the total $NO_x$ discharge A does not exceed the $NO_x$ emission judgment amount $A_0$ at Step S10, whereas the distance traveled C reaches the predetermined distance traveled $C_0$ at Step S9. In this case, the program moves to Steps S14 and S15 to reset the total $NO_x$ discharge A and the distance traveled C. Alternatively, at a time when the distance traveled C reaches the predetermined distance traveled $C_0$, $NO_x$ releasing control may be performed to release $NO_x$, whereafter the total $NO_x$ discharge A and the distance traveled C may be reset. As another embodiment, when the total $NO_x$ discharge A does not exceed the $NO_x$ emission judgment amount $A_0$, whereas the distance traveled C reaches the predetermined distance traveled $C_0$ at Step S9, only the distance traveled C may be rest, while the total $NO_x$ discharge A may remain in a nonreset state. In this case, when processing is started again at Step S1, the total $NO_x$ discharge A so far added up is read in as an $NO_x$ discharge $A_M$ kept in memory, and the same processings as stated above are performed.

Figure 5:
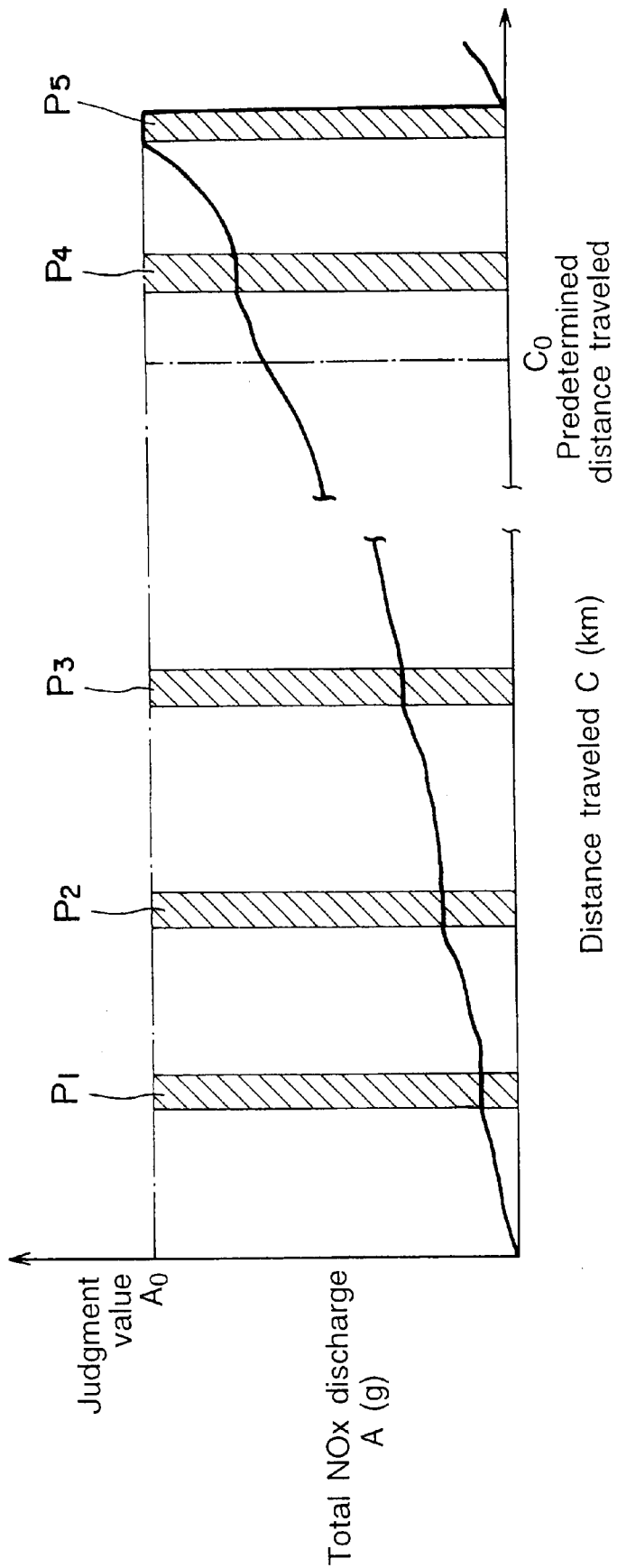

Such $NO_x$ discharge control will be described concretely. As shown in FIG. 5, a total $NO_x$ discharge A increases with the increase in the distance traveled C. In regions $P_1$, $P_2$, $P_3$, and $P_4$ where spontaneous acceleration takes place as a result of depression of the accelerator pedal by the driver, the exhaust air-fuel ratio changes to a rich or stoichiometric air-fuel ratio, and $NO_x$ is naturally released from the occlusion type $NO_x$ catalyst 25 (natural $NO_x$ purge). At this time, although the distance traveled C has reached the predetermined distance traveled $C_0$, the total $NO_x$ discharge A does not exceed the $NO_x$ emission judgment amount $A_0$. Thus, only the distance traveled C is reset. Then, the operation is started at the distance traveled C of 0. When the total $NO_x$ discharge A exceeds the $NO_x$ emission judgment amount $A_0$ before the distance traveled C reaches the new predetermined distance traveled $C_0$, the exhaust air-fuel ratio is forcibly changed to a rich air-fuel ratio in a region $P_5$ (including expansion stroke injection and slight rich or stoichiometric air-fuel ratio periods) to release $NO_x$ from the occlusion type $NO_x$ catalyst 25. Then, when the regeneration of the occlusion type $NO_x$ catalyst 25 is completed, the total $NO_x$ discharge A and the distance traveled C are reset to restart control of $NO_x$ discharge for the predetermined distance traveled $C_0$.

There may be a case where the total $NO_x$ discharge A does not exceed the $NO_x$ emission judgment amount $A_0$ although the distance traveled C reaches the predetermined distance traveled $C_0$. In this case, the distance traveled C is not reset, and after the total $NO_x$ discharge A exceeds the $NO_x$ emission judgment amount $A_0$ to perform $NO_x$ releasing control, the total $NO_x$ discharge A and the distance traveled C may be reset.

According to the exhaust emission control device of the present embodiment, $NO_x$ discharge control may be combined with forced $NO_x$ purge for enriching the air-fuel ratio during continuation of a lean operation as in the earlier technologies. In detail, if the duration of the lean operation is extremely long or the catalyst is deteriorated to worsen the purification efficiency markedly, aggravation of fuel economy is not curtailed, even if the duration of the lean operation is prolonged further. Thus, the air-fuel ratio may be changed to a rich or stoichiometric ratio to perform $NO_x$ purge forcibly.

Figure 3:
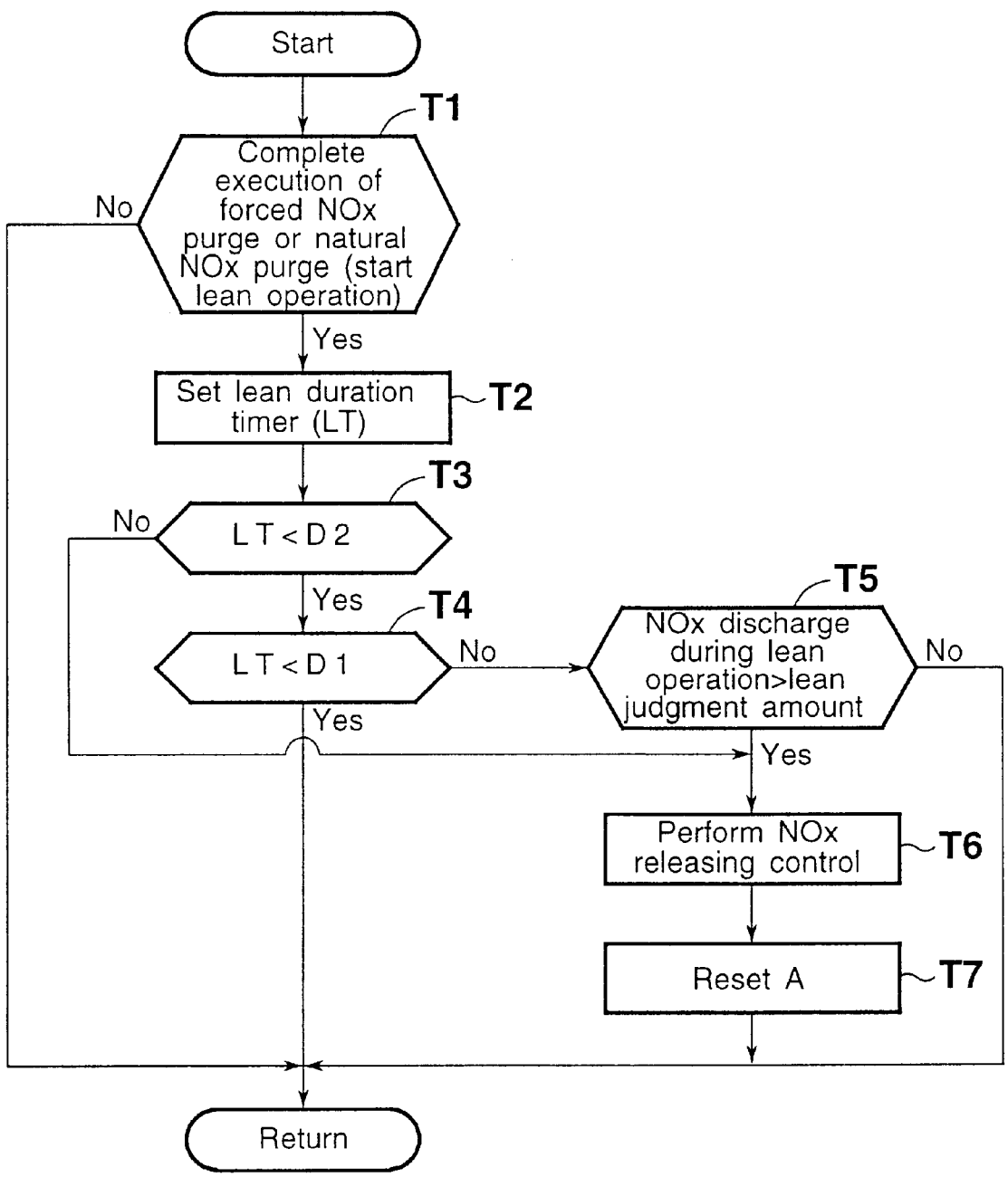
FIG. 3 is a flow chart for forced $NO_x$ purge control.

That is, as shown in the flow chart of FIG. 3, when signals for forced $NO_x$ purge or natural $NO_x$ purge are entered at Step T1, a lean operation duration timer LT is set at Step T2. At Step T3, it is judged whether or not the lean operation duration LT exceeds a maximum lean operation duration D2. If LT does not exceed D2, the program goes to Step T4. If the lean operation duration LT exceeds the maximum lean operation duration D2, the program proceeds to Step T6 to perform $NO_x$ releasing control, i.e., to change the exhaust air-fuel ratio to a rich air-fuel ratio, lowering the oxygen concentration. During this period, an initial predetermined time is assigned to execution of expansion stroke injection. After operation at a rich air-fuel ratio, a stoichiometric or slight rich operation is performed for a predetermined period, whereby $NO_x$ is released from the occlusion type $NO_x$ catalyst 25. The maximum lean operation duration D2 is a lean time during which $NO_x$ can be purged completely by acceleration which is a common practice. Assume, for example, that commonly performed acceleration lasts for about 15 seconds, and an $NO_x$ purge time which is about 25% of the lean time is necessary. Under these conditions, the maximum lean operation duration D2 is 60 seconds. If this time D2 is exceeded, common acceleration performed once cannot purge $NO_x$. In other words, natural $NO_x$ purge alone makes reliable $NO_x$ purge difficult, and forced $NO_x$ purge is considered to be necessary. Thus, a judgment based on the maximum lean operation duration D2 is set.

At Step T4, it is judged whether the lean operation duration LT exceeds an acceleration occurrence threshold time D1. If LT does not exceed D1, nothing is done, and the program comes out of this routine. If the lean operation duration LT exceeds the acceleration occurrence threshold time D1, the program goes to Step T5, judging whether the total $NO_x$ discharge A during the instant lean operation exceeds the lean judgment amount. The acceleration occurrence threshold time D1 corresponds to the cycle of acceleration occurrence. That is, the acceleration occurrence threshold time D1 is a value within which acceleration can be expected. For example, it is set to about 30 seconds. If a lean operation continues for more than this duration, acceleration is minimally likely to occur. That is, natural $NO_x$ purge has a low possibility to take place, and forced $NO_x$ purge is considered to be necessary. Based on this ground, the acceleration occurrence threshold time D1 is set.

The above-mentioned lean judgment amount is a judgment amount for suppressing the $NO_x$ discharge during each lean operation period, and can be computed from the following equation (3):

$$\text{Lean judgment amount} = \text{judgment value} \times \text{lean frequency} \times \text{control cycle} \quad (3)$$

where the judgment value (g/km) is the $NO_x$ emission judgment amount $A_0$ per km, and the control cycle is the sum of the distance traveled during the lean operation and the distance traveled during the $NO_x$ purge operation.

When the total $NO_x$ discharge A during the instant lean operation exceeds the lean judgment amount at Step T5, the program goes to Step T6 to perform $NO_x$ releasing control in the same manner as stated earlier, i.e., to change the exhaust air-fuel ratio to a rich air-fuel ratio, lowering the oxygen concentration. During this period, an initial predetermined time is assigned to execution of expansion stroke injection. After operation at a rich air-fuel ratio, a stoichiometric or slight rich operation is performed for a predetermined period, whereby $NO_x$ is released from the occlusion type $NO_x$ catalyst 25. If the total $NO_x$ discharge A does not exceed the lean judgment amount, nothing is done, and the program comes out of this routine.

At this Step T5, $NO_x$ releasing control is executed if the total $NO_x$ discharge A during the instant lean operation exceeds the lean judgment amount. However, $NO_x$ releasing control may be executed, when the mean $NO_x$ concentration during the lean operation duration LT exceeds a predetermined value. In this case, the mean $NO_x$ concentration may be the average of the detection values of the $NO_x$ sensor 27 during the lean operation duration LT, or may be the instantaneous value of the $NO_x$ sensor 27 at a time when the lean operation duration LT elapses. The predetermined value of the mean $NO_x$ concentration is a map with respect to the engine speed Ne and the target mean effective pressure Pe. The predetermined value may be the $NO_x$ concentration multiplied by 0.5, if $NO_x$ releasing control is assumed so that the purification efficiency of the occlusion type $NO_x$ catalyst 25 will be maintained, for example, at 50% or more; or may be set at a value close to 0 if the purification efficiency is to be 100%.

The control for forced $NO_x$ purge may be judged to be completed when the total $NO_x$ discharge A is the $NO_x$ emission judgment amount $A_0$ or less, and the $NO_x$ purge time is a predetermined time or more, e.g., a value not less than the product of the preceding lean operation time and an $NO_x$ purge coefficient E1. In this case, if the $NO_x$ purge time is required to be about 25% of the lean time, for example, the $NO_x$ purge coefficient E1 is 0.25.

In agreement with the timings with which the air-fuel ratio is switched to a lean or stoichiometric ratio by spontaneous acceleration as in the regions $P_1$, $P_2$, $P_3$ and $P_4$ in the aforementioned embodiments, it is permissible to perform $NO_x$ releasing control, i.e., enrichment of the air-fuel ratio to a predetermined A/F for a predetermined period of time (or the predetermined A/F may be a stoichiometric ratio, including a slight rich ratio, depending on catalyst characteristics), and expansion stroke injection for a predetermined period of time during an initial stage at the changed A/F, and a stoichiometric (slight rich) operation for a predetermined period of time after enrichment (rich operation, expansion stroke injection, and stoichiometric operation done in harmony with spontaneous acceleration are herein termed $NO_x$ releasing control). By so doing, while $NO_x$ purge can be performed more reliably, a rich operation is done synchronously with switching to the rich or stoichiometric air-fuel ratio due to acceleration originally intended by the driver. Thus, the amount of fuel required for a rich operation can be decreased compared with forced $NO_x$ purge for performing a rich operation during a process which should originally have been a lean operation.

Furthermore, when the driver expects shock associated with acceleration, the air-fuel ratio is switched accordingly. Thus, the driver feels little shock due to switching of the air-fuel ratio, in comparison with forced $NO_x$ purge for performing a rich operation during a lean operation with a timing not expected by the driver. In addition, when $NO_x$ releasing control is to be performed in agreement with a change in the air-fuel ratio due to spontaneous acceleration or the like, this control may be performed only when switching from the lean mode to the stoichiometric mode. When the lean mode is switched to the rich mode, $NO_x$ releasing control may be designed to be unexecuted, on the assumption that the air-fuel ratio has already become rich. Besides, whether $NO_x$ releasing control should be done or not may be judged in accordance with the degree of the rich mode during spontaneous acceleration.

That is, the target air-fuel ratio during $NO_x$ releasing control is set to be the upper limit value of the air-fuel ratio (the limiting value of the lean side). If the degree of richness during spontaneous acceleration is low, for example, if the target air-fuel ratio during spontaneous acceleration is set to be on a leaner side than the target air-fuel ratio during $NO_x$ releasing control, enrichment by $NO_x$ releasing control is performed so that the air-fuel ratio will not be on a leaner side than the target air-fuel ratio during $NO_x$ releasing control. If the operation is deemed to be fully rich, such as to a high degree of acceleration, for example, if the target air-fuel ratio during spontaneous acceleration is set to be on a richer side than the target air-fuel ratio during $NO_x$ releasing control, enrichment due to $NO_x$ releasing control need not be performed. When the lean mode changes to the stoichiometric mode because of spontaneous acceleration, only enrichment and expansion stroke injection may be carried out, and a procedure for producing the stoichiometric (slight rich) mode may be omitted. Such a method of combining $NO_x$ releasing control with switching of the air-fuel ration by spontaneous acceleration is herein called natural $NO_x$ purge.

With the exhaust emission control device of an internal combustion engine according to the present embodiment, as stated above, the $NO_x$ sensor 27 detects the concentration of $NO_x$ that can be released from the occlusion type $NO_x$ catalyst 25 into the atmosphere. Based on the output of the $NO_x$ sensor 27, the total $NO_x$ discharge A releasable into the atmosphere is computed. When the total $NO_x$ discharge A has exceeded the $NO_x$ emission judgment amount $A_0$, which corresponds to the $NO_x$ emission judgment amount designated under the $NO_x$ emission regulations, before the distance traveled C reaches the predetermined distance traveled $C_0$, the exhaust air-fuel ratio is changed to a rich air-fuel ratio to release and reduce $NO_x$ from the occlusion type $NO_x$ catalyst 25 efficiently, followed by changing the rich air-fuel ratio to a stoichiometric air-fuel ratio. In this manner, $NO_x$ is reduced and purified by the three-way function of the catalyst.

Hence, $NO_x$ discharge can be restricted to a desired value with good accuracy by directly managing $NO_x$ discharge amount during a predetermined period. At the same time, there is no need to give a large margin to the judgment value based on expectation of various driving conditions, as with the use of the earlier technologies for judging the $NO_x$ discharge for each short lean operation zone to start $NO_x$ purge (forced $NO_x$ purge). Nor is the frequency of $NO_x$ purge increased. Thus, aggravation of fuel economy due to $NO_x$ purge, i.e., the increase in the $CO_2$ discharge, is very small. The frequency of natural $NO_x$ purge varies with various factors such as the situation of the road or the driver's driving characteristics. Forced $NO_x$ purge involves a rich or stoichiometric operation in a region which is originally a region of a lean operation, thus increasing fuel consumption considerably. The present invention, therefore, uses forced $NO_x$ purge minimally, and makes utmost use of chances for natural $NO_x$ purge, which is free from or minimal in poor fuel economy, to realize $NO_x$ purge. In the aforementioned embodiment in which natural $NO_x$ purge is not combined with forced $NO_x$ purge, natural $NO_x$ purge by a driver's accelerating action or the like is waited for during an initial stage of a predetermined driving period. As the predetermined driving period approaches an end, and only when the total $NO_x$ discharge may exceed the judgment value in the presence of natural $NO_x$ purge alone, $NO_x$ releasing control and $NO_x$ suppressing control are performed. Thus, aggravation of fuel economy due to $NO_x$ purge, i.e., the increase in the $CO_2$ discharge, is negative or minimal. Even in the embodiment in which natural $NO_x$ purge is combined with forced $NO_x$ purge, forced $NO_x$ purge is minimally performed. Thus, aggravation of fuel economy due to $NO_x$ purge, i.e., the increase in the $CO_2$ discharge, is likewise very limited.

Besides, when the $NO_x$ occluding ability of the occlusion type $NO_x$ catalyst 25 is excellent depending on the type of this catalyst, only $NO_x$ suppressing control may be performed, without execution of $NO_x$ releasing control. That is, $NO_x$ releasing control, including forced $NO_x$ purge and $NO_x$ releasing control in agreement with spontaneous acceleration, is not performed. Instead, when the total $NO_x$ discharge A reaches the $NO_x$ emission judgment amount $A_0$, only $NO_x$ suppressing control is performed. This is because when the $NO_x$ occluding ability is excellent, $NO_x$ may be fully purgeable by the rich or stoichiometric mode ascribed to spontaneous acceleration intended by the driver. Even if there is a case in which $NO_x$ cannot be purged, $NO_x$ is purified and reduced by the three-way function of the catalyst by means of $NO_x$ suppressing control. By so doing, a further increase in fuel consumption, i.e., a further increase in $CO_2$ discharge, can be prevented.

According to the present embodiment, as described above, judgment of the total $NO_x$ discharge A over the predetermined distance traveled $C_0$ makes it possible to suppress aggravation of fuel economy, restrict the $NO_x$ discharge over the predetermined period to the desired value, comply with the $NO_x$ emission regulations, and decrease the $CO_2$ discharge amount.

Second Embodiment

An exhaust emission control device of an internal combustion engine according to a second embodiment performs control so as to change a lean operation region according to the status of $NO_x$ emission at each time point (i.e., total No discharge A), thereby restricting the total $NO_x$ discharge during driving over a predetermined driving period to a predetermined value or less. By do doing, the exhaust emission control device achieves a decrease in fuel consumption and a decrease in $NO_x$ discharge at the same time. Even when a lean operation is performed in all or part of a vehicle acceleration process, this device can reliably restrict the total $NO_x$ discharge during the predetermined driving period to a predetermined value or less.

Figure 7:
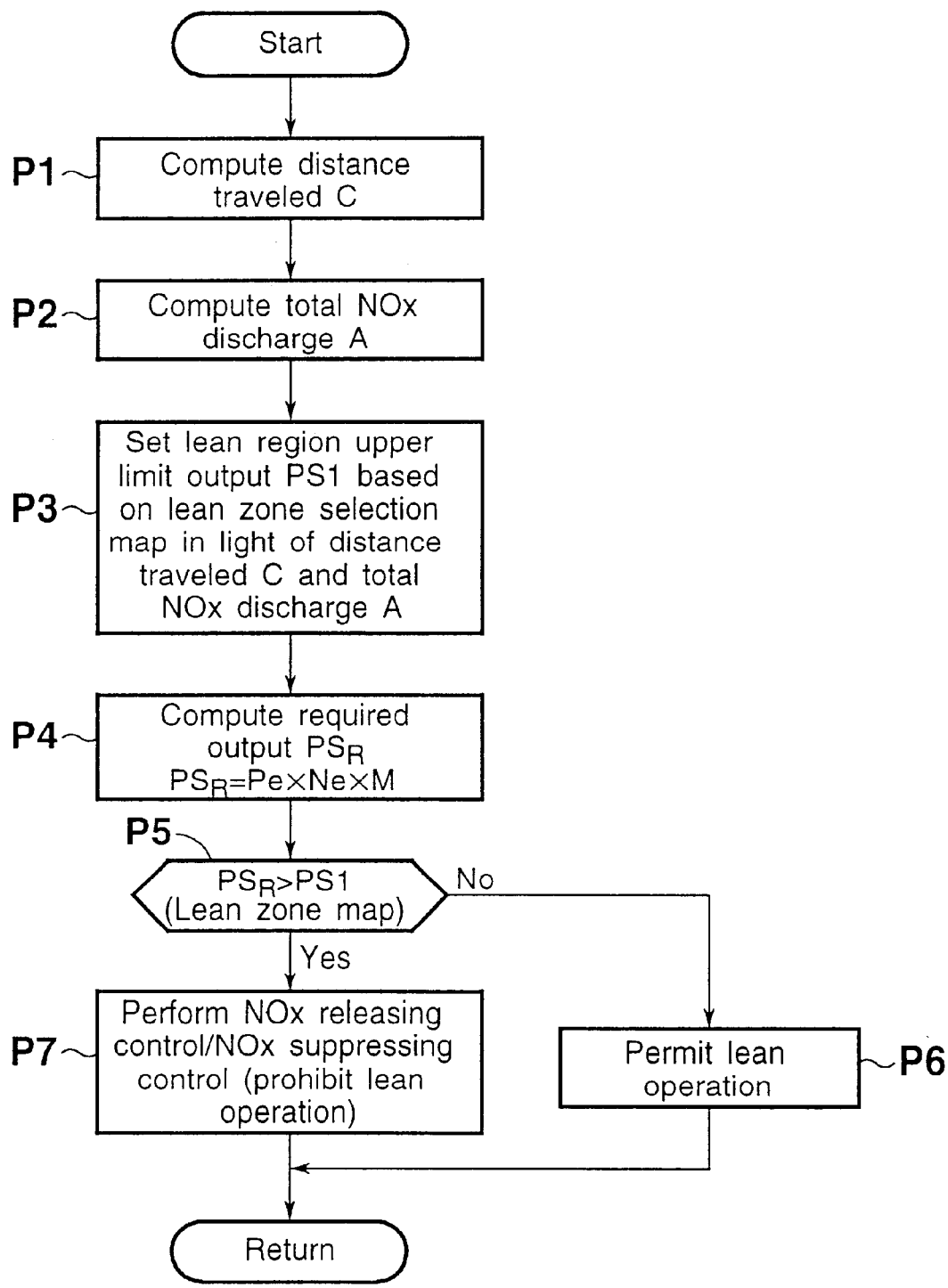
FIG. 7 is a flow chart for $NO_x$ discharge control by an exhaust emission control device of an internal combustion engine according to a second embodiment of the present invention.

That is, as shown in FIG. 7, a distance traveled C after resetting of a distance traveled counter (not shown) is computed at Step P1. A total $NO_x$ discharge A, including an $NO_x$ amount discharged during a period from resetting until activation of an $NO_x$ sensor 27, is computed at Step P2. The method of computing the total $NO_x$ discharge A is the same as in the aforementioned First Embodiment.

Figure 8:
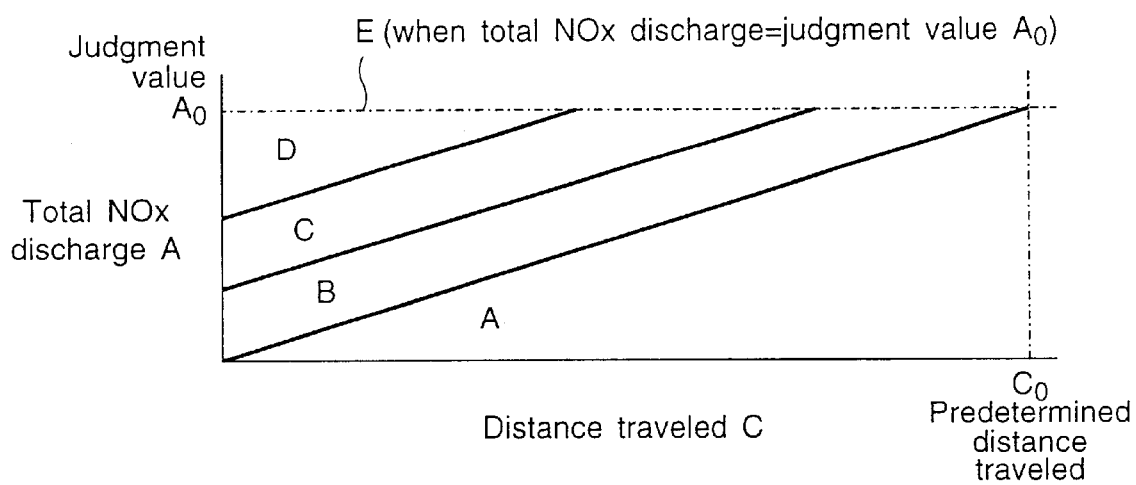
FIG. 8 is a lean zone selection map based on a distance traveled and a total $NO_x$ discharge.

At Step P3, a lean region upper limit output is set based on a lean zone selection map relevant to the found distance traveled C and the total $NO_x$ discharge A. The lean zone selection map shows a region which is defined by a horizontal axis as a distance traveled C and a vertical axis as a total $NO_x$ discharge A, and which is divided into a plurality of areas, for example, as shown in FIG. 8. The area below a line connecting the origin (distance traveled C=0, total $NO_x$ discharge A=0) to a point, at which relative to a predetermined distance traveled $C_0$, the total $NO_x$ discharge A reaches an $NO_x$ emission judgment amount $A_0$, is designated as an PA1=A area. (If the distance traveled C and the total $NO_x$ discharge A at the current time point reside in the PA1-A area, a travel continued at the current pace of $NO_x$ discharge can be expected to result in the $NO_x$ emission judgment amount $A_0$ or less at a time when the distance traveled C reaches the predetermined distance traveled $C_0$.) The other areas, defined by a plurality of lines parallel to this line and lying below the $NO_x$ emission judgment amount $A_0$, are designated as PA1=B, PA1=C and PA1=D from below. The area corresponding to the total $NO_x$ discharge A=the $NO_x$ emission judgment amount $A_0$ is designated as PA1=E.

Thus, at Step P3, the lean region upper limit output is set according to which area in the lean zone selection map an intersection of the distance traveled C and the total $NO_x$ discharge A at the current time point resides in. At Step P4, an output required by a vehicle, $PS_R$, is computed from the following equation (4) where the coefficient M is a coefficient for matching the units.

$$\text{Required output } PS_R = \text{target mean effective pressure } Pe \times \text{engine speed } Ne \times \text{coefficient } M \quad (4)$$

Figure 9:
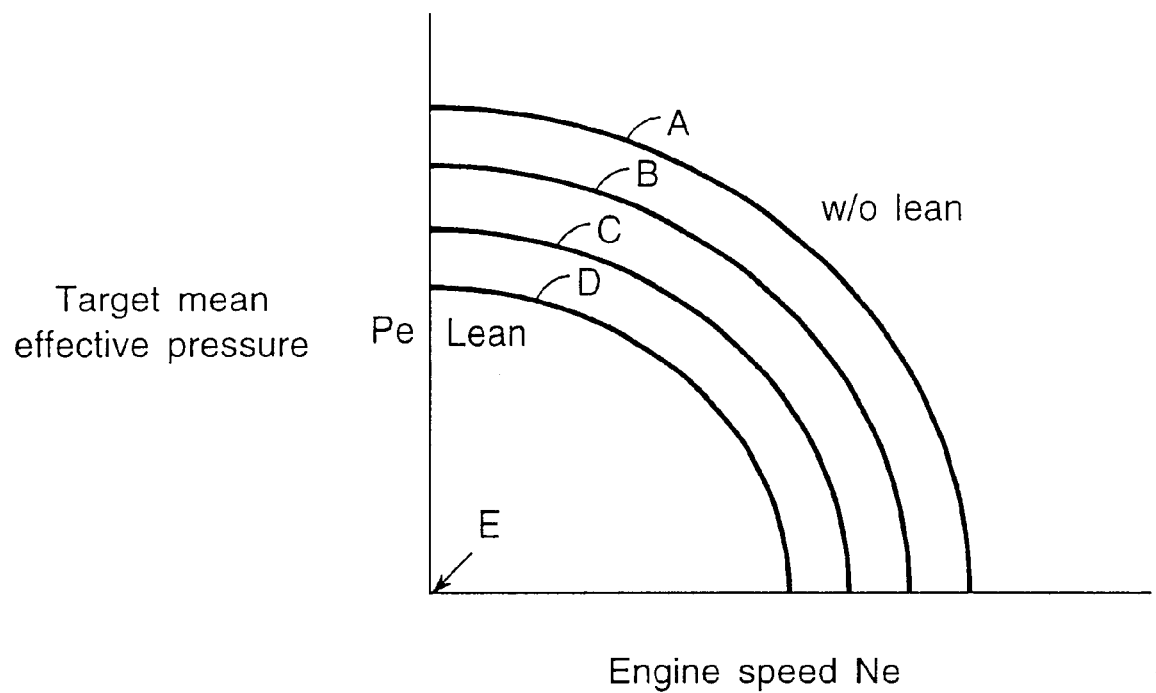
FIG. 9 is a lean zone map based on an engine speed and a target mean effective pressure.

At Step P5, it is judged by a lean zone map whether the required output $PS_R$ is greater than the lean region upper limit output PS1 found by the lean zone selection map. This lean zone map shows a region defined by a horizontal axis representing an engine speed Ne and a vertical axis representing a target mean effective pressure Pe, and divided by a plurality of equal output lines each connecting points at which engine output equals, as shown in FIG. 9. The inside of each line is a lean operation region, and the outside of the outermost line is a W/O lean (stoichiometric or rich) operation region.

According to this lean zone map, a boundary A representing an initial lean zone is set such that a lean operation region can be maximally widened from the aspect of combustion, etc. without much consideration for the aspect of fuel consumption. By doing so, even a high load region becomes a lean operation region, and a lean operation can be made during acceleration or the like. In an actual operation, a steady operation (normally, a lean operation) is rare, and a transient operation (an accelerated operation or a decelerated operation; normally, a stoichiometric or rich operation in the case of the accelerated operation) is frequent. As a result, the frequency of the lean operation increases, and fuel economy can be improved. When a lean operation is performed in all or part of a process which has been judged to be an acceleration process because of a rapid change rate in accelerator depression, an all lean operation becomes possible in the range of ordinary driving, thus enabling fuel consumption to be decreased markedly. In the lean zone map, a boundary D is a line passing through output points necessary for a steady run at a vehicle speed of 60 km/h, if at least a lean operation, for example, at a vehicle speed of 60 km/h is desired, even when the catalyst deteriorates, and the $NO_x$ discharge increases, thus necessitating a narrow lean operation zone.

Thus, provided that the lean region output set at Step P3 is PS1=A, the inside of the boundary A is a lean operation region, and the outside of the boundary A is a non-lean (W/O lean) operation region in the lean zone map shown in FIG. 9. At Step P5, it is judged which region the required output $PS_R$ found resides in.

If the required output $PS_R$ resides in the lean operation region at Step P5, the program goes to Step S6 to continue the lean operation. If the required output $PS_R$ resides in the non-lean operation region, the program goes to Step S7 to prohibit the lean operation and execute $NO_x$ releasing control and then execute $NO_x$ suppressing control. In this case, $NO_x$ releasing control may be performed, with any of a rich exhaust air-fuel ratio, a stoichiometric exhaust air-fuel ratio, and expansion stroke injection being selected in accordance with the characteristics of the catalyst. If the lean upper limit output set at Step P3 is PS1=E, $NO_x$ cannot be discharged any more. This corresponds to the region E in the lean zone map, a region in which a lean operation is prohibited no matter how much the required output $PS_R$ is.

In the lean zone selection map shown in FIG. 8 and the lean zone map shown in FIG. 9, the areas formed by division of the region are not restricted to A to E, and the region may be divided to more or fewer areas. In the lean zone map shown in FIG. 9, moreover, the region is divided by the engine equal output lines, but may be divided by tailpipe $NO_x$ discharge lines, such as equal engine out $NO_x$ discharge lines.

With the exhaust emission control device of an internal combustion engine according to the present embodiment, as stated above, the $NO_x$ sensor 27 detects the concentration of $NO_x$ that can be released from the occlusion type $NO_x$ catalyst 25 into the atmosphere. Based on the output of the $NO_x$ sensor 27, the total $NO_x$ discharge A releasable into the atmosphere is computed. When the total $NO_x$ discharge A is expected to exceed the $NO_x$ emission judgment amount $A_0$, which corresponds to the $NO_x$ emission judgment amount designated under the $NO_x$ emission regulations, before the distance traveled C reaches the predetermined distance traveled $C_0$, the operation region at a lean air-fuel ratio is decreased.

Thus, the operation region at a lean air-fuel ratio is enlarged or decreased according to the situation of $NO_x$ emission based on the status of the purifying ability of the occlusion type $NO_x$ catalyst 25 at each time point. As a result, the total $NO_x$ discharge during a predetermined period can be restricted to a desired value. Besides, a lean operation can be performed in all of, or even in part of, a vehicle acceleration process. Even when the frequency of the lean operation is increased thereby, the total $NO_x$ discharge A during a predetermined period can be restricted to a desired value. Thus, fuel consumption can be reduced markedly.

In the above-described embodiment, the $NO_x$ emission judgment amount AO for judging the total $NO_x$ discharge A has been set at a constant value. However, the regulatory value of the $NO_x$ emission regulations has been classified by the vehicle speed, for example, the $NO_x$ emission judgment amount $A_0$ may be set according to the vehicle speed, and may be smoothly changed according to a change in the average vehicle speed over a predetermined period. For example, the $NO_x$ emission judgment amount $A_0$ may be set by a map. For instance, a judgment value $C_1$ (g/km) at a low vehicle speed, and a judgment value $C_2$ (g/km) at a high vehicle speed may be set, and intermediate values between them may be obtained by linear interpolation. In this case, $C_1 < C_2$.

If the $NO_x$ emission judgment amount $A_0$ is set according to the vehicle speed, the $NO_x$ discharge $A_0$ (g) may be determined not by the average vehicle speed, but based on summation of the judgment values in response to the vehicle speed at each time point, as shown by the following equation (5):

$$A_{(n)} = A_{(n-1)} + H \times V \times dt \quad (5)$$

where H is the judgment value (g/km) found from a map responsive to the instantaneous vehicle speed V, and dt is the calculation cycle.

The predetermined distance traveled $C_0$ for judging the total $NO_x$ discharge A may be 1 km, which is the control unit mainly used according to the $NO_x$ emission regulations in different countries of the world, or may be less than 1 km. The shorter this distance, the better the judgment accuracy of the $NO_x$ discharge can be made. Alternatively, the predetermined distance traveled $C_0$ may be set at 4 km, for example. The total $NO_x$ discharge A is computed at smaller intervals than 4 km, for example, at intervals of 1 km. That is, computation is performed in 4 patterns. By judging the total $NO_x$ discharge A for each pattern, the accuracy of judgment of the $NO_x$ discharge can be increased.

In the aforementioned embodiment, the $NO_x$ emission judgment amount Ao was determined by multiplying the $NO_x$ emission allowable amount by a percentage allowance $\alpha$. However, the $NO_x$ emission judgment amount $A_0$ may be determined, as a difference, by subtracting the percentage allowance $\alpha$ from the $NO_x$ emission allowable amount. Furthermore, the $NO_x$ emission judgment amount $A_0$ may be changed according to the proportion of an operation other than a lean operation. In addition, the percentage allowance a may be changed according to the total distance traveled, in consideration of a change over time of the $NO_x$ sensor 27 due to deterioration. Then, the percentage allowance $\alpha$ is divided into a percentage allowance al by influence due to the $NO_x$ discharge during an operation other than a lean operation, and a percentage allowance $\alpha 2$ by influence due to the detection accuracy of the $NO_x$ sensor 27. These percentage allowances $\alpha 1$ and $\alpha 2$ are multiplied by, or subtracted from, the $NO_x$ emission allowable amount, whereby the $NO_x$ emission judgment amount $A_0$ may be determined.

Besides, the output of the $NO_x$ sensor 27 is corrected for in consideration of a change over time of the $NO_x$ sensor 27 due to deterioration, and the corrected value may be used in computing the total $NO_x$ discharge.

Also, the maximum lean operation duration D2, the acceleration occurrence threshold time D2, and the $NO_x$ purge coefficient E1 may be determined by the ability of the occlusion type $NO_x$ catalyst 25, or may be determined according to deterioration of the occlusion type $NO_x$ catalyst 25. A method for judging the deterioration of the occlusion type $NO_x$ catalyst 25 may be selected from a decrease in the lean frequency (if switch between a lean operation and other operation is judged using the $NO_x$ sensor), the total distance traveled, the output value of the $NO_x$ sensor 27, the difference in output between the $NO_x$ sensor disposed upstream from the occlusion type $NO_x$ catalyst 25 and the $NO_x$ sensor 27 disposed downstream from the occlusion type $NO_x$ catalyst 25, and changes in the behavior, during $NO_x$ releasing control, of a linear A/F sensor or $O_2$ sensor newly disposed downstream or upstream from the occlusion type $NO_x$ catalyst 25. Further, the maximum lean operation duration D2, and the acceleration occurrence threshold time P1 may be determined by learning the characteristics of each driver during a travel.

However, if the maximum lean operation duration D2, and the acceleration occurrence threshold time D2 are made two small, e.g., about 5 to 10 seconds, the frequency of forced $NO_x$ purge increases, and fuel consumption increases. Particularly when tailing of the air-fuel ratio is carried out at the time of switching the air-fuel ratio during forced $NO_x$ purge, an accumulation of the air-fuel ratio tailing time involved in air-fuel ratio switching, which does not contribute greatly to $NO_x$ release, increases to increase the overall fuel consumption. At the same time, shock at switching results in poor drivability. Thus, the lower limit value of the maximum lean operation duration D2 should be about 20 to 30 seconds.

Also, initiation or completion of forced $NO_x$ purge may be judged using the output of an $NO_x$ sensor. Further, an $NO_x$ sensor may also be disposed upstream of the occlusion type $NO_x$ catalyst 25. Based on the difference in output between the $NO_x$ sensor disposed upstream from the occlusion type $NO_x$ catalyst 25 and the $NO_x$ sensor 27 disposed downstream, a decline in the catalyst purification efficiency may be judged to stop the lean operation and perform forced $NO_x$ purge. Alternatively, the $NO_x$ concentrations during a stoichiometric operation and a rich operation may be found from the output of the $NO_x$ sensor, and added for computation of the total $NO_x$ emission judgment amount A, or used for judgment on completion of $NO_x$ releasing control. Further, the $NO_x$ sensor 27 is disposed downstream of the three-way catalyst 26, but may be disposed between the occlusion type $NO_x$ catalyst 25 and the three-way catalyst 26, whereby the emission behavior of the occlusion type $NO_x$ catalyst 25 can be measured with a good response. In this case, computation of the total $NO_x$ discharge is performed in consideration of the output of the $NO_x$ sensor and the purification efficiency of the three-way catalyst 26 disposed downstream from the $NO_x$ sensor. Instead of the $NO_x$ concentration output of the $NO_x$ sensor, a linear A/F output of the $NO_x$ sensor may be used for the control. Instead of the output from the $NO_x$ sensor, the output of a linear A/F sensor, or an $O_2$ sensor, e.g., a catalyst-equipped $O_2$ sensor having a catalyst attached to its surface layer, may be used for the control.

In connection with a rich operation, expansion stroke injection, and a stoichiometric (slight rich) operation during $NO_x$ releasing control, their respective parameters, such as time, air-fuel ratio, etc., may be set based on a lean operation time used immediately before these operations, or the $NO_x$ discharge during a lean operation period immediately before these operations. As an optimum $NO_x$ release method for releasing $NO_x$ reliably, $NO_x$ releasing control is performed by a combination of a rich operation, expansion stroke injection, and a stoichiometric (slight rich) operation. However, the optimum $NO_x$ release method changes according to the releasing characteristics of the occlusion type $NO_x$ catalyst, and the respective parameters, such as time, air-fuel ratio, etc., are determined by the type of the occlusion type $NO_x$ catalyst, and further its combination with the three-way catalyst. Depending on the type of the catalyst or the manner of combination, therefore, expansion stroke injection may be omitted, or the stoichiometric (slight rich) period may be omitted, or the rich period may be omitted. Furthermore, both the rich period and expansion stroke injection may be omitted, and only the stoichiometric (slight rich) period may be provided. Alternatively, both expansion stroke injection and the stoichiometric (slight rich) period may be omitted, and only the rich period may be provided.

According to the present embodiment, $NO_x$ discharge control is performed using the $NO_x$ sensor 27. However, the total $NO_x$ emission judgment amount A can be computed from the following equation (6) without use of the $NO_x$ sensor 27 to control the $NO_x$ discharge.

$$A_{(n)} = A_{(n-1)} + NO_x\ \text{discharge} \times \text{calculation cycle} \quad (6)$$

where the $NO_x$ discharge (g/s) is the amount of $NO_x$ releasable into the atmosphere that is a value experimentally found beforehand by the load/revolution speed map of the engine 11 or a vehicle speed map. Since the $NO_x$ sensor 27 is not used, this type of control is advantageous in terms of cost.

The $NO_x$ discharge varies according to the purification efficiency of the catalyst. Particularly when the occlusion type $NO_x$ catalyst 25 is poisoned with S in the fuel, i.e., sulfur, the purification efficiency markedly lowers. On the other hand, when the catalyst with the purification efficiency decreased because of S-poisoning is treated at a high temperature (e.g., 550° C. or higher) and at a rich air-fuel ratio, the amount of S accumulated in the catalyst is released to regenerate the catalyst and restore the purification efficiency (S regeneration). Thus, in finding the total $NO_x$ discharge A without using the $NO_x$ sensor 27, it is advisable to consider how much S is accumulated in the catalyst to lower the purification efficiency, namely, to what degree S regeneration takes place, as shown in the following equation (7):

$$A_{(n)}=A_{(n-1)}+K\times\{NO_{x0}\times(1-TR)+NO_{x1}\times TR\}\times\text{calculation cycle} \quad (7)$$

where the $NO_{x0}$ is the $NO_x$ discharge (g/s) as the amount of $NO_x$ releasable into the atmosphere when S regeneration cannot be performed, namely, when S is accumulated in a saturated state to lower the purification efficiency. This may be an experimentally obtained value which can be set as a load/revolution speed map or a vehicle speed map. On the other hand, $NO_{x1}$ is the $NO_x$ discharge (g/s) as the amount of $NO_x$ releasable into the atmosphere when S regeneration has been completed, namely, when S is not accumulated immediately after S regeneration. This value may be set as a load/revolution speed map or a vehicle speed map, similar to $NO_{x0}$. K is a parameter concerned with an air-fuel ratio, and is 1 during a lean operation or 0 in a state other than a lean operation, provided that $NO_x$ discharge is summed only during a lean operation. TR represents the degree of S regeneration, the degree to which S regeneration takes place. Assume that a predetermined time T (e.g., a suitable value of 3 to 10 minutes) is required as a time, during which the temperature of the occlusion type $NO_x$ catalyst 25 reaches a temperature corresponding to a predetermined temperature (e.g., 700° C.), in order to release the amount of S accumulated in the occlusion type $NO_x$ catalyst 25 during a run over a predetermined distance traveled $C_s$ (e.g., a suitable value of 500 to 1,000 km) (i.e., the time is S regeneration time). In this case, TR is calculated from Equation (8), indicated below, as a ratio between the actual distance traveled and the S regeneration time. The S regeneration speed varies with the temperature of the occlusion type $NO_x$ catalyst 25, and as this temperature rises, the S regeneration speed increases exponentially. Thus, the S regeneration time may be calculated as the S regeneration time at a suitable catalyst temperature (e.g., 700° C.) in consideration of the S regeneration speed at each catalyst temperature. In view of the TR, the degree of S regeneration is judged, and the total $NO_x$ discharge A is found from the two maps on $NO_x$ discharge, i.e., $NO_{x0}$ (S regeneration is absent) and $NO_{x1}$ (S regeneration is present).

$$TR=(\text{actual } S\text{regeneration time/actual distance traveled})/(\text{predetermined } S\text{regeneration time } T_s/\text{predetermined distance traveled } C_S) \quad (8)$$

The purification efficiency of the occlusion type $NO_x$ catalyst is lowered by heat deterioration as well as S poisoning. Thus, factors representative of the degree of decline in the purification efficiency, other than S poisoning, may include the influence of the total distance traveled.

According to the above-described embodiment, a predetermined distance traveled is a predetermined period as a cycle of computation of the total $NO_x$ discharge A, and $NO_x$ discharge control over a predetermined distance traveled is performed. However, the unit may be time, and control over a predetermined time may be performed. That is, if the control unit under the $NO_x$ emission regulations is a predetermined time, the cycle of computation of the total $NO_x$ discharge A may be a predetermined time, and $NO_x$ discharge control over a predetermined time may be performed.

In the foregoing embodiment, the exhaust emission purification catalyst device having an occlusion type $NO_x$ catalyst has been described. However, the present invention is characterized by changing the exhaust air-fuel ratio so that the total $NO_x$ discharge A will not exceed a predetermined value before a travel period of a vehicle is reached. The present invention is not restricted to the type or location of the catalyst. For example, the proximity three-way catalyst may be an exhaust manifold integrated type, or the proximity three-way catalyst may be absent. In the present embodiment, the occlusion type $NO_x$ catalyst is used in the exhaust emission purification catalyst device, but an $NO_x$ catalyst of an adsorption type for directly reducing $NO_x$ adsorbed to the catalyst may be used as stated earlier. Furthermore, a selective reduction type $NO_x$ catalyst, which can purify $NO_x$ in an exhaust gas in the presence of HC at an exhaust air-fuel ratio being a lean air-fuel ratio, may be used. In this case, $NO_x$ releasing control is not performed. In addition, any type of engine capable of a lean operation may be used. The engine may be a manifold fuel injection type lean burn engine, or a diesel engine.

Industrial Applicability

As described above, the exhaust emission control device of an internal combustion engine according to the present invention restricts the $NO_x$ discharge at a desired value reliably under any driving conditions, and achieves a decrease in $NO_x$ discharge and a decrease in $CO_2$ discharge at the same time. This device is preferred for use in a lean burn engine having an occlusion type $NO_x$ catalyst in an exhaust passage.

What is claimed is:

1. An exhaust emission control device of an internal combustion engine, comprising:

an exhaust emission purification catalyst device provided in an exhaust passage of the internal combustion engine, and having an $NO_x$ decreasing function of purifying or occluding $NO_x$ in an exhaust gas when an exhaust air-fuel ratio is a lean air-fuel ratio, and a reducing function of reducing hazardous substances in the exhaust gas when the exhaust air-fuel ratio is one of a stoichiometric air-fuel ratio and a rich air-fuel ratio;

$NO_x$ detection means for detecting or estimating a concentration of $NO_x$ released into an atmosphere; and control means for computing a total $NO_x$ discharge by integrating a momentary $NO_x$ discharge released into the atmosphere after measuring a predetermined driving period of a vehicle based on an output from the $NO_x$ detection means, and stopping or suppressing an operation at a lean air-fuel ratio when detecting or expecting that a total $NO_x$ discharge exceeds a predetermined value before a vehicle reaches a predetermined driving period.

2. The exhaust emission control device of an internal combustion engine as claimed in claim 1, wherein the control means changes the exhaust air-fuel ratio to said one of the stoichiometric air-fuel ratio and the rich air-fuel ratio when detecting that the total $NO_x$ discharge has exceeded the predetermined value before the vehicle reaches the predetermined driving period.

3. The exhaust emission control device of an internal combustion engine as claimed in claim 2, wherein after changing the exhaust air-fuel ratio to said one of the stoichiometric air-fuel ratio and the rich air-fuel ratio when detecting that the total $NO_x$ discharge has exceeded the predetermined value before the vehicle reaches the predetermined driving period, the control means maintains the exhaust air-fuel ratio at said one of the stoichiometric air-fuel ratio and the rich air-fuel ratio until the vehicle reaches the predetermined driving period.

4. The exhaust emission control device of an internal combustion engine as claimed in claim 1, wherein the control means decreases an operation region at the lean air-fuel ratio when the total $NO_x$ discharge is expected to exceed the predetermined value before the vehicle reaches the predetermined driving period.

5. The exhaust emission control device of an internal combustion engine as claimed in claim 4, wherein the control means changes the operation region at the lean air-fuel ratio based on the total $NO_x$ discharge midway through the predetermined driving period.

6. The exhaust emission control device of an internal combustion engine as claimed in claim 1, wherein the control means resets computation of the total $NO_x$ discharge and measurement of the predetermined driving period when the vehicle reaches the predetermined driving period.

7. The exhaust emission control device of an internal combustion engine as claimed in claim 1, wherein when the total $NO_x$ discharge does not exceed the predetermined value even when the vehicle has reached the predetermined driving period, the control means changes the exhaust air-fuel ratio to said one of the stoichiometric air-fuel ratio and the rich air-fuel ratio after the total $NO_x$ discharge exceeds the predetermined value, and then the control means resets computation of the total $NO_x$ discharge and detection of the predetermined driving period.

8. The exhaust emission control device of an internal combustion engine as claimed in claim 1, wherein when duration of the operation at the lean air-fuel ratio exceeds a predetermined threshold time, the control means changes the exhaust air-fuel ratio to said one of the stoichiometric air-fuel ratio and the rich air-fuel ratio.

9. The exhaust emission control device of an internal combustion engine as claimed in claim 1, wherein when duration of the operation at the lean air-fuel ratio is a predetermined threshold time or more, and if one of the total $NO_x$ discharge, an average $NO_x$ concentration, an instantaneous $NO_x$ concentration is a predetermined value or more during the predetermined threshold time or more, the control means changes the exhaust air-fuel ratio to said one of the stoichiometric air-fuel ratio and the rich air-fuel ratio.

10. The exhaust emission control device of an internal combustion engine as claimed in claim 1, wherein the control means changes the predetermined value for the total $NO_x$ discharge according to a vehicle speed.

11. The exhaust emission control device of an internal combustion engine as claimed in claim 1, wherein the exhaust air-fuel ratio is changed to said one of the stoichiometric air-fuel ratio and the rich air-fuel ratio in response to a driver's acceleration action, and fuel injection into a cylinder in and after an expansion stroke is used concomitantly at an initial stage of changing the air-fuel ratio.

12. The exhaust emission control device of an internal combustion engine as claimed in claim 1, wherein the predetermined driving period is an actual traveled distance of a vehicle, and the predetermined driving period is a predetermined distance.

* * * * *